United States Patent [19]
Tomita et al.

[11] Patent Number: 5,313,633
[45] Date of Patent: May 17, 1994

[54] PROCESS AND DEVICE FOR DECIDING CLASS HIERARCHICAL RELATIONSHIP OF OBJECT ORIENTED LANGUAGE AND PROCESS AND DEVICE FOR DETERMINING METHOD UTILIZING THE SAME

[75] Inventors: Hiroshi Tomita; Kiyozumi Yoshimura, both of Kawasaki, Japan

[73] Assignees: Hitachi, Ltd.; Hitachi Seibu Soft Ware Co., Ltd., both of Tokyo, Japan

[21] Appl. No.: 529,955

[22] Filed: May 29, 1990

[30] Foreign Application Priority Data

May 31, 1989 [JP] Japan .................. 1-135862

[51] Int. Cl.⁵ .................. G06F 9/40
[52] U.S. Cl. .................. 395/700; 364/DIG. 1; 364/280; 364/280.4
[58] Field of Search .................. 395/700; 364/DIG. 1, 364/280, 280.4

[56] References Cited

U.S. PATENT DOCUMENTS 4,739,477  4/1988  Barker et al. .................. 364/300
4,930,071  5/1990  Tou et al. .................. 364/300

*Primary Examiner*—Gareth D. Shaw
*Assistant Examiner*—A. Katbab
*Attorney, Agent, or Firm*—Fay, Sharpe, Beall, Fagan, Minnich & McKee

[57] ABSTRACT

A process and a device for deciding class hierarchical relationship of an object oriented language which, in decision of the relationship of class inheritance of an object oriented language having a hierarchical relationship of classes, performs coding processing for affixing the codes each having a predetermined relation to each of those classes and decides the relationship of inheritance in a hierarchy of two optional classes with said series of codes affixed to said two optional classes having said hierarchical relationship.

17 Claims, 26 Drawing Sheets

FIG. 4
PRIOR ART

| CLASS | SUPER CLASS | DEFINED METHOD | DEFINED AND INHERITED METHOD |
|---|---|---|---|
| CLASS a |  | A1 B1 C1 | A1 B1 C1 |
| CLASS b | CLASS a | A2 D1 | A2 B1 C1<br>D1 |
| CLASS c | CLASS b | A3 B2 E1 | A3 B2 C1<br>D1 E1 |
| CLASS d | CLASS b | E2 F1 | A2 B1 C1<br>D1 E2 F1 |
| CLASS e | CLASS a | D2 | A1 B1 C1<br>D2 |

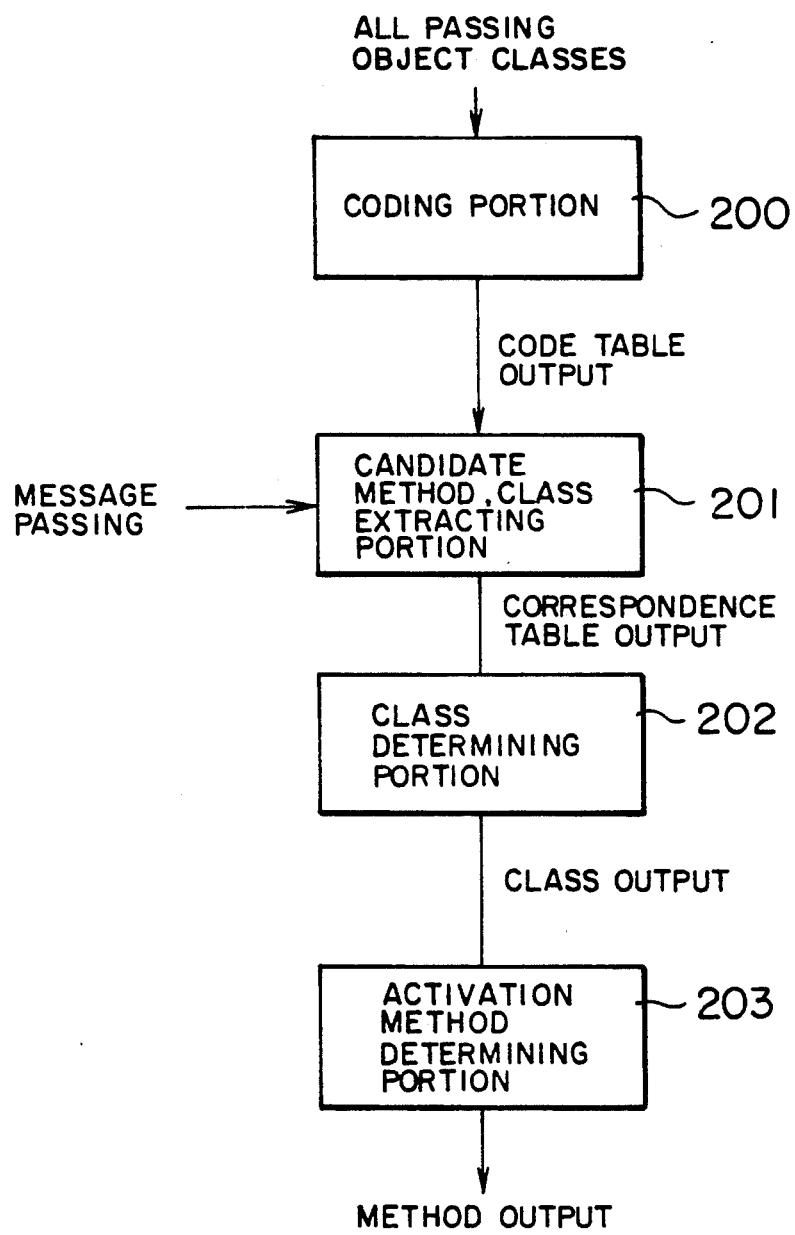

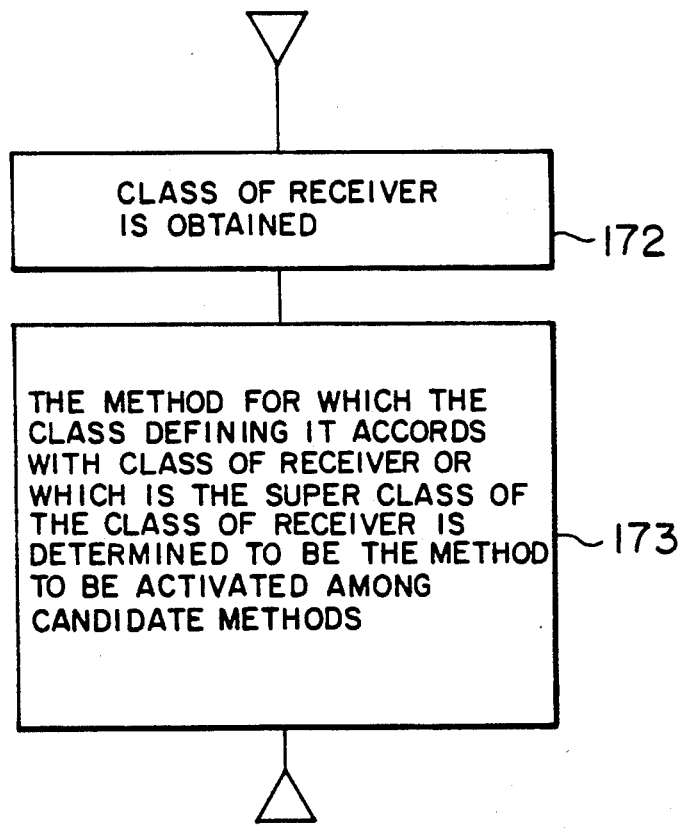

FIG. 10

| CLASS NAME (181) | CODE (182) | MINIMAL VALUE OF CODES OF EACH CLASS AND ITS SUB CLASS (183) | MAXIMAL VALUE OF CODES OF EACH CLASS AND ITS SUB CLASS (184) |
|---|---|---|---|
| CLASS a | 1 | 1 | 5 |
| CLASS b | 2 | 2 | 4 |
| CLASS c | 3 | 3 | 3 |
| CLASS d | 4 | 4 | 4 |
| CLASS e | 5 | 5 | 5 |

| CANDIDATE METHOD 185 | CLASS NAME 181 | MINIMAL VALUE OF CODES OF EACH CLASS AND ITS SUB CLASS 183 | MAXIMAL VALUE OF CODES OF EACH CLASS AND ITS SUB CLASS 184 |
|---|---|---|---|
| METHOD A3 | CLASS c | 3 | 3 |
| METHOD A2 | CLASS b | 2 | 4 |
| METHOD A1 | CLASS a | 1 | 5 |

186

F I G. 12

| CANDIDATE METHOD 185 | CLASS NAME 181 | MINIMAL VALUE OF CODES OF EACH CLASS AND ITS SUB CLASS 183 | MAXIMAL VALUE OF CODES OF EACH CLASS AND ITS SUB CLASS 184 |
|---|---|---|---|
| METHOD D1 | CLASS b | 2 | 4 |
| METHOD D2 | CLASS e | 5 | 5 |

187

F I G. 14

| CLASS NAME | CODE |
|---|---|
| CLASS a | 1 |
| CLASS b | 10 |
| CLASS c | 100 |
| CLASS d | 101 |
| CLASS e | 11 |

FIG. 15

| CANDIDATE METHOD (185) | CLASS NAME (181) | CODE |
|---|---|---|
| METHOD A3 | CLASS c | 100 |
| METHOD A2 | CLASS b | 10 |
| METHOD A1 | CLASS a | 1 |

FIG. 16

| CANDIDATE METHOD (185) | CLASS NAME (181) | CODE |
|---|---|---|
| METHOD D1 | CLASS b | 10 |
| METHOD D2 | CLASS e | 11 |

FIG. 20

| CLASS NAME | HOLDING METHOD |
|---|---|
| CLASS a | A 1 |
| CLASS b | A 2 |
| CLASS c | A 3 |
| CLASS d | |
| CLASS e | |

PROCESS AND DEVICE FOR DECIDING CLASS HIERARCHICAL RELATIONSHIP OF OBJECT ORIENTED LANGUAGE AND PROCESS AND DEVICE FOR DETERMINING METHOD UTILIZING THE SAME

BACKGROUND OF THE INVENTION

The present invention relates to a process of deciding class inheritance of an object oriented language and a process and a device for determining a method based on described message passing in execution of a program described in a programming language classified into the object oriented language, and more particularly to a process and a device for determining a method in the object oriented language in which high-speed execution is aimed at by compiling.

In the object oriented language, a data structure called an object holds a procedure called a method. In order to execute the method held by the object, the method is activated by performing message passing to said object from another object. In general, since the object holds a plurality of methods, it is determined by a message selector included in message passing which method is to be activated by the message passing. Since the object holds the methods individually, the activated method differs when the object which is a passing destination of message passing which is called a receiver is different even for the same message selector.

Generally, in the object oriented language, the method is defined by a template of an object called a class, and an object created as an instance of a certain class (an object which belongs to said class) has all the methods declared in said class in common. A hierarchical relationship can be defined between two classes, and the method defined in a class in the super hierarchy is inherited in a class in its sub hierarchy. That is, by defining the hierarchical relationship of classes, it is possible to hold the method defined in a super class in common in a sub class without redefinition.

The above-described hierarchical relationship of classes is such that the direct super class of a certain class is only one, what is called single inheritance. The method is distinguished by a message selector which is defined for every method. This message selector corresponds to a method name. It is not allowed to define a different method having the same message selector in the same class. However, if the class is different, it is possible to define a method having the same message selector. When the method having the same message selector as the method inherited from the super class is defined, the method inherited from the super class is invalidated.

As described above, it is determined by the method held by the receiver and the message selector which method is activated by message passing. In case the object of the receiver is ascertained not at the execution time or in case the object is varied as often as execution, it is required to determine the method at the execution time of message passing. Conventionally, this method determining process has been implemented by retrieving the methods with the message selector obtained from a correspondence table of the class to which the receiver belongs as a key when the method and the message passing are executed in every class as discussed in "Multi-Paradigm Language TAO" written by Takeuchi (Magazine "bit" Vol. 20, No. 7, pp. 67-70, 1988). A dichotomizing search and a hash method are used as the retrieving method in this case.

When the method is inherited in accordance with the hierarchical relationship of classes, a process in which a correspondence table including all the inherited methods is provided in every class and a process in which only the methods defined in the class is provided as the correspondence table are known as the forming process of the correspondence table. In the former case, the method can be determined by retrieving only the correspondence table held by the class to which the receiver belongs as the determining process of the method. In the latter case, when the correspondence table held by the class to which the receiver belongs is retrieved and the corresponding method is found non-existent, it is possible to determine the method by performing similar retrieval operation on the class in the super hierarchy of the relevant class.

In the prior art as the premise of the present invention, it will be explained how to determine the method activated by above-described message passing from the message selector included in the message and the object (receiver) which is the passing destination.

First, the hierarchical relationship among the classes of the present object oriented language and the inheritance of the methods which are the premise of embodiments shown hereafter will be explained with a conventional exemplification with reference to FIG. 1 through FIG. 4.

FIG. 1 shows a hierarchy of classes defined in the present object oriented language and methods defined in respective classes. In FIG. 1, 110 to 114 denote classes and 115 to 118 denote hierarchical relationship among those classes. For example, the hierarchical relationship 115 shows that the direct super class of a class b 111 is a class a 110. 120 to 130 denote the methods defined in respective classes, the alphabetical portions denote method names, and the numerical portions denote explanatory symbols affixed for the purpose of distinguishing different methods. That is, the method A1 (120), the method A2 (123) and the method A3 (125) are different methods having the same method name A. The class b 111 inhibits the method A1 (120), the method B1 (121) and the method C1 (122) from the class a 110 which is the super class thereof. However, since the method A2 (123) and the method D1 (124) are defined in the class b 111, inheritance of the method A1 (120) is invalidated, and the methods held in the class b 111 are the method A2 (123), the method B1 (121), the method C1 (122) and the method D1 (124).

Next, in FIG. 2, an object showing a polygon will be explained as a more concrete illustration of the classes of the object as compared with FIG. 1. As shown in this FIG. 2, a triangle, a quadrangle and a pentagon are defined as sub classes of the polygon. Furthermore, an isosceles triangle is defined as a sub class of the triangle and an equilateral triangle is defined as the sub class of this isosceles triangle. It is possible to define a parallelogram as the sub class of the quadrangle and a rectangle and a rhombus as the sub classes of this parallelogram. Such a relationship illustrates the hierarchy of the polygon.

It is possible to define a method in each of these classes. For example, as shown in FIG. 3, a method AREA which seeks after an area can define the methods. Here, a method which is applicable to all the polygons is defined in the class polygon. This method is referred to as AREA 1 (the title if AREA, but 1 is affixed for the sake of distinction). Further, since the area of a triangle is obtained as "base×height/2", AREA 2 which executes "base×height/2" can be defined for the triangle. Similarly, AREA 4 which executes "one side×$\sqrt{3}/2$" can be defined for the equilateral triangle, and AREA 5 which executes "longer side× shorter side" can be defined for the square. In such a manner, it is possible to define classes and methods as shown in FIG. 3.

The hierarchical relationship of the classes and the inheritance of the methods shown in FIG. 1 are consolidated in FIG. 4.

In the next place, the relationship between the message passing and the methods activated by said message passing will be explained with exemplifications shown in FIG. 1 through FIG. 4. The message passing from a certain object to another object in the present object oriented language is described as shown hereunder for instance.

(send ?X A(3))

In this exemplification, ?X denotes a variable indicating an object which is a receiver of the message sending, A denotes a message selector and 3 denotes a parameter. By means of this message passing, those methods that accord with the message selector A are activated among those methods held by the classes to which ?X belongs. Here, when ?X is an object which belongs to the class c 112, the activated method is the method A3 (125), and when ?X is an object which belongs to the class b 111 or the class d 113, the activated method is the method A2 (123), and further, when ?X is an object which belongs to the class a 110 or the class e 114, the activated method is the method A1 (120). The foregoing is determined univocally from a column 143 as defined and inherited methods in FIG. 4.

Similarly, in case of message passing:

(send ?X D(3))

p When ?X is an object which belongs to the class b 111, the class c 112 or the class d 113, the activated method is the method D1 (124). When ?X is an object which belongs to the class e 114, the activated method is the method D2 (130), and when ?X is an object which belongs to the class a 110, the activated method does not exist, and an execution time error is produced.

Two types of conventional processes of the process of determining a method which is activated by message passing will be explained hereafter.

First of all, a conventional process I includes a data structure which holds a summary with respect to every class of the direct super class of said class and the methods defined in those classes. This corresponds to a class column 140, a super class column 141 and a defined method column 142 shown in FIG. 4. The processing of determining a method using above-described data structure is shown in FIG. 5.

In this processing, a class to which an object corresponding to the receiver belongs is obtained first (step 150). Here, every object belongs to some class, and it can be found easily which object belongs to which class because of under control of a processing system. However, the procedure has no direct relationship with the present invention. Hence its explanation is omitted. The processing for obtaining a class of an object is discussed in detail in "Small talk 80 The Language and it's Implementation", 1983 by Adele Goldberg and David Robson published by Addison-Wesley Publishing Company.

After the processing in this step 150, it is searched to find whether a method which accords with the message selector exists in the method defined in that class or not (step 151). When it exists, that method is determined to be the method to be activated (step 155). When it does not exist, it is checked whether a super class of that class exists or not (step 152). If a direct super class does not exist, any method to be activated does not exist, producing execution time error (step 154). If a direct super class exists, the searched class is determined as the direct super class thereof (step 153), and the step 151 and thereafter are repeated.

Next, in a conventional process II, there is provided in every class a data structure which holds a summary of methods defined in that class and methods inherited from super classes. The foregoing corresponds to the class column 140 and the column 143 of defined and inherited methods shown in FIG. 4. The processing of determining a method using this data structure is shown in FIG. 6.

In the present processing, a class to which an object corresponding to the receiver is obtained first in a similar manner as the conventional process I (step 160), and it is searched whether any method which accords with the message selector exists in the methods defined and inherited in that class or not (step 161). When it exists, that method is determined to be the method to be activated (step 162). Further, when it does not exist, a method to be activated does not exist, producing an execution time error (step 163).

In the conventional process II, the capacity of the data structure of the method summary for every class is larger as compared with the conventional process I. However, since the method can be determined by means of searching of one data structure only, this process is capable of determining a method at a higher speed than the conventional process I. Besides, dichotonizing search using a binary search table, a hash method using a hash table and the like are used for the data structure of method summary and the searching method thereof.

In above-described both conventional processes I and II, search processing of the method is performed whenever message passing is executed Accordingly, when the summary of the method which becomes a searching object is increased, searching takes time, thus reducing the execution speed as described previously.

As described with reference to above illustrations, there is such a problem in a conventional technique that, when an object of a receiver is not ascertained to be the execution time, or then it is varied as often as every execution, it is required to retrieve the correspondence table of the methods and the message selectors whenever message passing is executed, thus taking a long time for processing. In particular, when the types of methods held by the same object are increased, the speed is lowered to a great extent. Accordingly, the execution speed of an interpreter of the object oriented language in which above-described method determining process is adopted is low, and the execution speed of an objective code which is output by a compiler which outputs above-described method determining process as an objective code is also low.

Further, there is such a problem that, when a method is determined without retrieving the correspondence table of the methods and the message selectors in every message passing, it is required to judge the relationship of inheritance between the class to which the receiver which is the passing destination of message passing belongs and the class defining the method at the execution time, and the speed at the execution time is lowered if the speed of judging this relationship of inheritance is low.

SUMMARY OF THE INVENTION

It is an object of the present invention which has been made in view of above-described circumstances to solve above-described problems in the prior art and to provide a process and a device for determining a method to be activated at a higher speed at the execution time. Further, it is another object of the present invention to provide a process and a device which judge the relationship of inheritance of classes at a higher speed for the sake of implementing a higher speed method determining process such as described above.

The above-described objects of the present invention may be achieved by a process and a device for deciding a relationship of class inheritance of an object oriented language having hierarchical relationship of classes, characterized in that coding processing in which codes are affixed to respective classes in advance is performed and processing of deciding the relationship of inheritance with the codes affixed to two classes the relationship of inheritance of which is desired to be decided, and a process and a device for determining a method to be activated by message passing described in the object oriented language with the information of a receiver which is the passing destination of message passing and a message selector of message passing, characterized in that extraction processing of candidate methods to be activated is performed based on the message selector, and that method final determination processing in which the method to be activated is determined finally is performed based on the information of said receiver among extracted candidate methods.

In a process and a device for deciding class inheritance of an object oriented language of the present invention, processing of coding classes for making the process of deciding class inheritance easy is performed in such a manner that, with respect to a hierarchical relationship of classes having a tree construction, the tree is traced starting from the class corresponding to the root while giving priority to the depth, and numbers are affixed in the order of respective classes in the tracing order. With this, consecutive numbers are affixed to the classes corresponding to all the knars of the tree portions in the tree construction. Thus, it can be decided easily that a class having a number is a sub class of the class corresponding to the root of that tree portion and that a class having a number other than the above is not a sub class. To be concrete, for example, a class holding the minimal code and the maximal code of the sub class and having a code of the minimal code or more and the maximal code or less is decided as the sub class and those classes having other codes are decided not to be the sub classes.

As described previously, an object belongs to some class, and, by passing a message to the object, a method which is held by the class to which that object belongs, that is, which is defined in that class or inherited from the super class is activated.

Thus, in the process and the device for determining a method of the object oriented language according to the present invention, extraction processing of candidates of methods to be activated is performed based on the message selector before execution of message passing, and method final determination processing in which the method to be activated is determined finally among extracted candidate methods is performed based on the information of said receiver. Further, in order to search the method defined in the class to which the object of the receiver belongs and the super class thereof at a high speed, coding which makes it possible to decide the relationship of inheritance easily is performed with respect to respective classes before execution of message passing, and processing of deciding from the code affixed as described above whether the class defining respective methods is a super class of the class to which the receiver belongs or not is performed.

Above-described method candidate extraction processing is performed before execution of message passing, and all the methods that have the possibility of being activated are extracted by the types of the message selectors irrespective of which class the receiver belongs to. To be concrete, all that have the same message selector is extracted among all the methods defined in the system. The extracted methods are stored in the correspondence table which shows the correspondence to class names defining those methods.

Further, above-described method final determination processing is performed in such a manner that, at the execution time of message passing, the class to which the receiver belongs is obtained, the method which has been declared in the super class of the class to which the receiver belongs is retrieved in the correspondence table drawn up in the method candidate extraction processing, and the method which is found is determined as the method to be activated by message passing. When a class having a relationship of inheritance exists in abovesaid correspondence table, the retrieval order of the correspondence table is started from the sub class. With such an order, the method of the super class will never be activated erroneously even in case the method of the super class is not inherited by the method defined in the sub class.

BRIEF DESCRIPTION OF THE DRAWINGS

FIG. 4 shows a summary of the relationship shown in FIG. 1;

FIG. 7 is a block diagram showing the composition of a first embodiment of the present invention;

FIGS. 8A and 8B are flow charts showing the operation of blocks shown in FIG. 7;

FIG. 10 is a code table showing outputs in the step 170;

FIG. 11 and FIG. 12 are candidate method correspondence tables of outputs in the step 171;

FIG. 14 is a coding table which is output from the step 170 in a second embodiment;

FIG. 15 and FIG. 16 are candidate method tables which are output from the step 171 thereof;

FIG. 20 is a method holding information illustration diagram of the third embodiment;

DESCRIPTION OF THE PREFERRED EMBODIMENTS

Illustrated embodiments of the present invention will be described hereafter.

FIG. 7 is a block diagram showing an embodiment of a class decision and method determination device which performs class inheritance decision and method determination of an object oriented language at the same time according to the present invention. First of all, the operation of the device shown in FIG. 7 will be described briefly. The device consists of blocks composed of a coding portion 200, a candidate method and class extracting portion 201, a class determining portion 202 and an activation method determining portion 203. Here, the coding portion 200 receives a hierarchy of whole passing objects such as illustrated in FIG. 9 and outputs a code table 180 shown in FIG. 10, and the candidate method and class extracting portion 201 receives the output of said code table and outputs a correspondence table such as shown in FIG. 11 or FIG. 12 according to a message selector included in message passing. Further, class determining portion 202 obtains a class to which an object corresponding to a receiver belongs and outputs it. Lastly, the activation method determining portion 203 determines and outputs the method to be activated.

The operation of this device will be explained based on flow charts shown in FIG. 8A and FIG. 8B by dividing into before execution and after execution of message passing from one object to another object.

Figure 1:
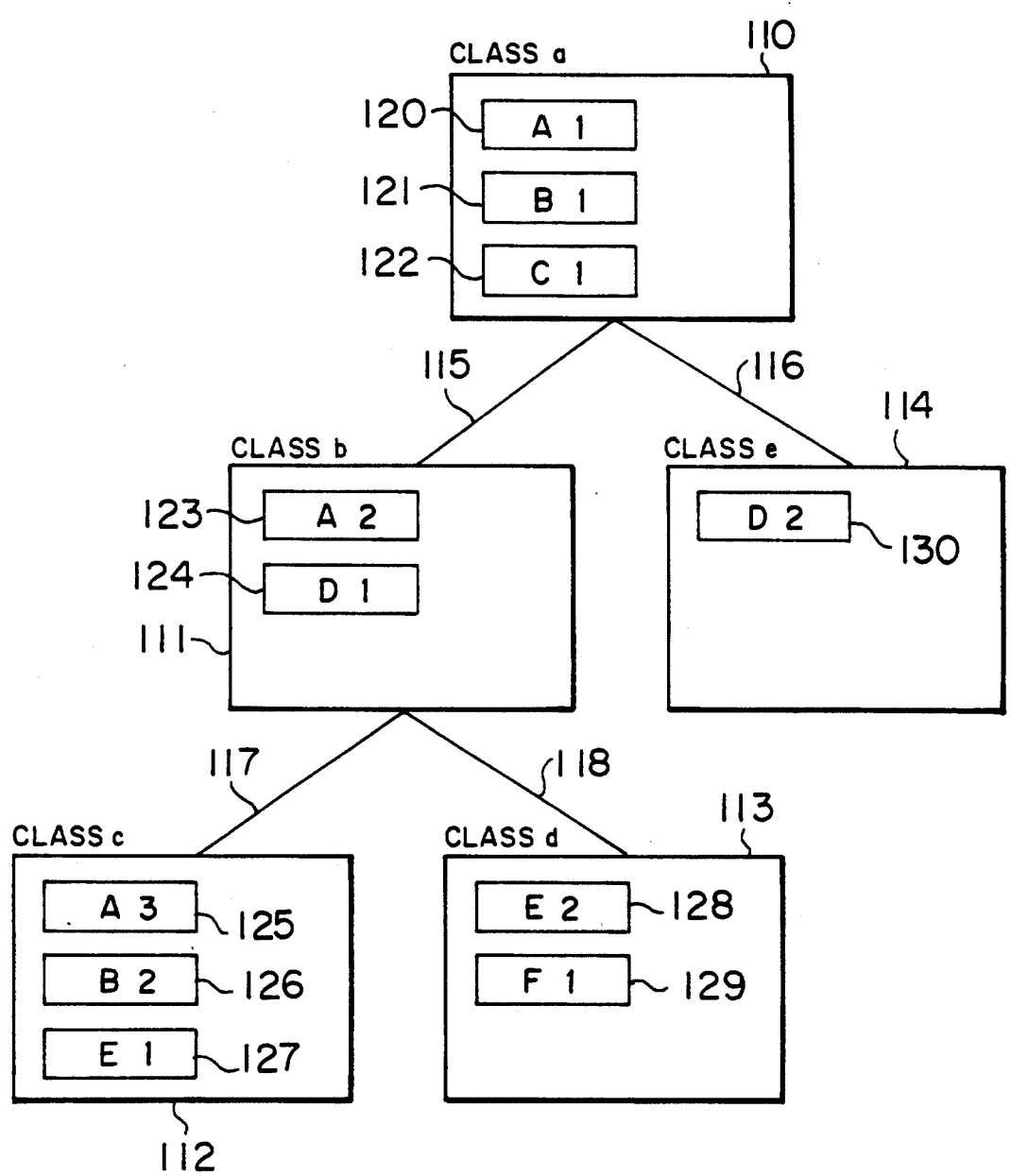
FIG. 1 is an illustration diagram of class hierarchy of an object oriented language.
Figure 2:
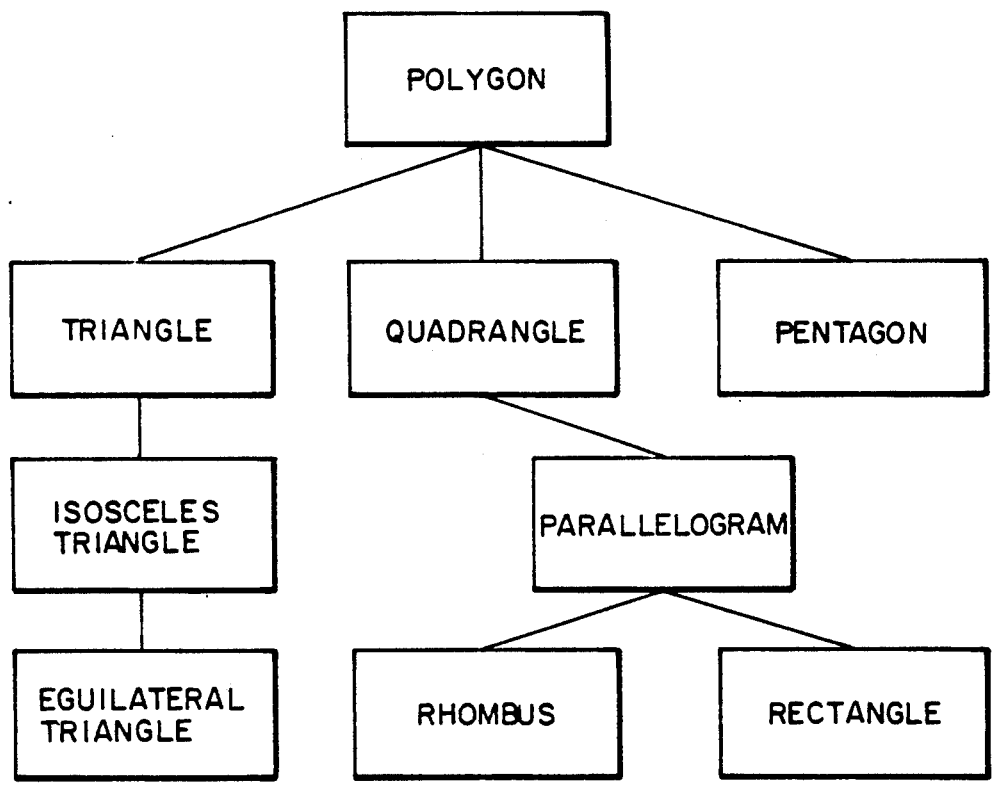
FIG. 2 is an illustration diagram of more concrete class hierarchy.
Figure 3:
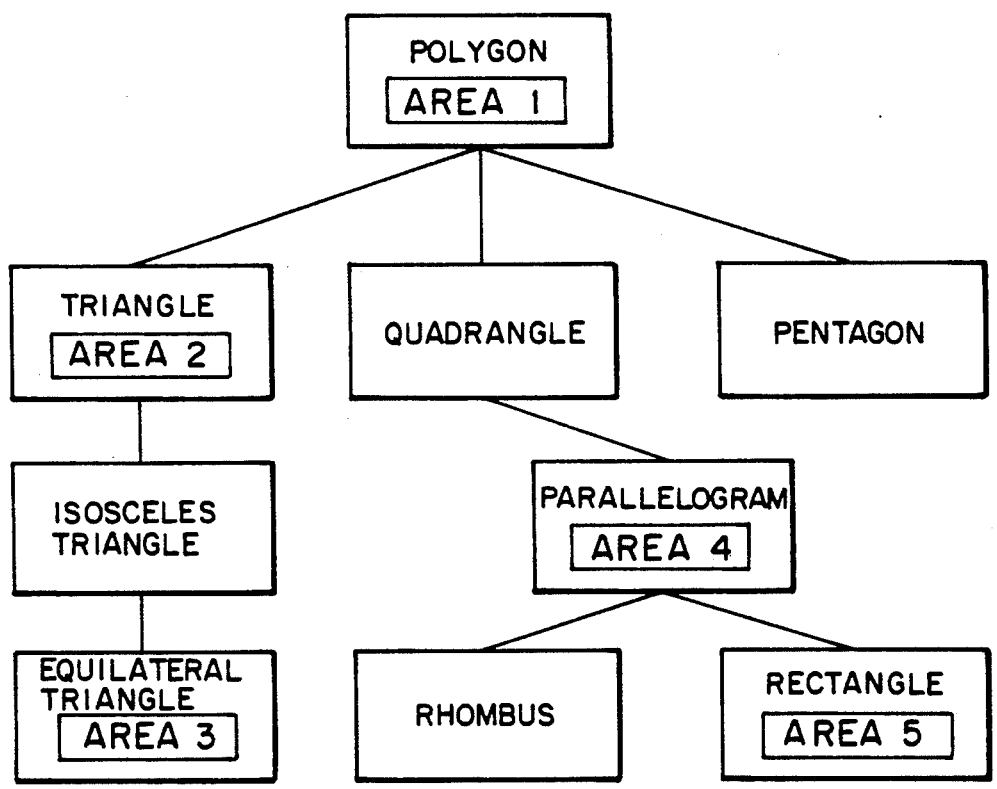
FIG. 3 is an illustration diagram showing definition of methods.
Figure 5:
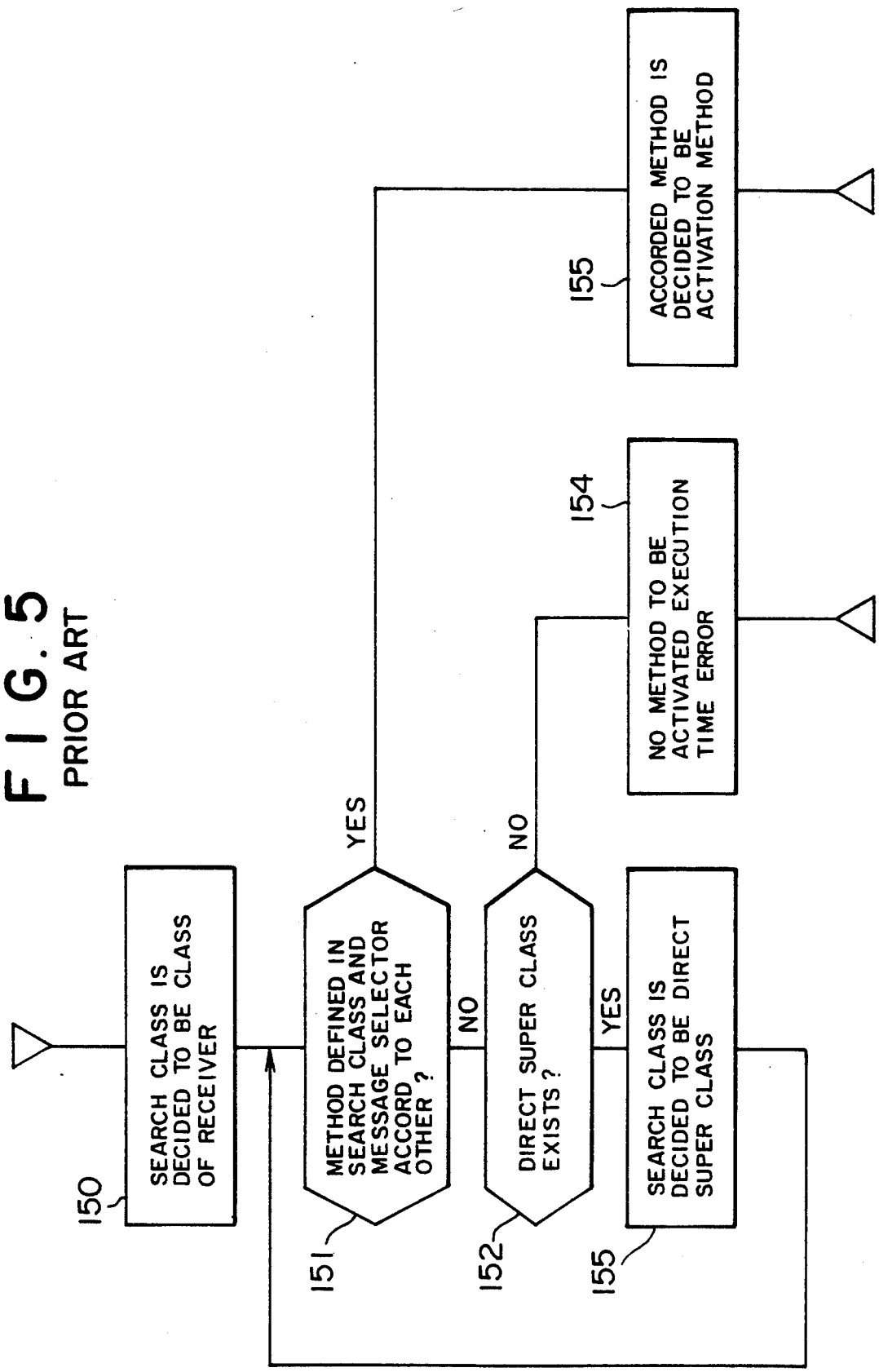
FIG. 5 is a flow chart showing the conventional process I.
Figure 6:
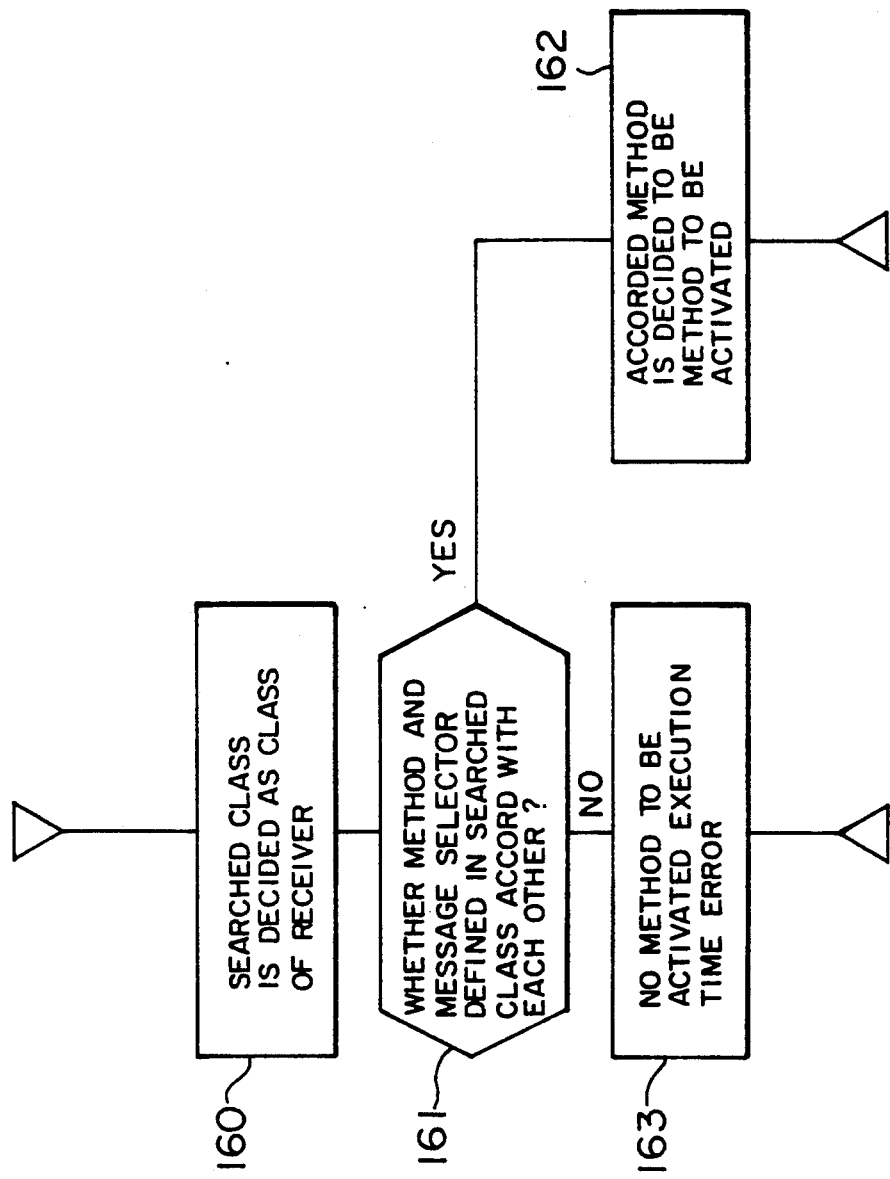
FIG. 6 is a flow chart showing the conventional process II.
Figure 8A:
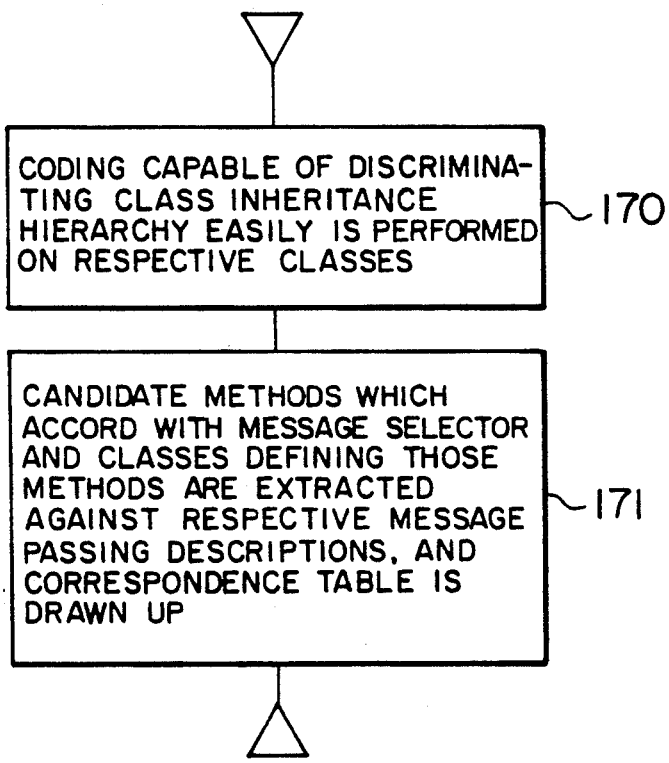
Figure 9A:
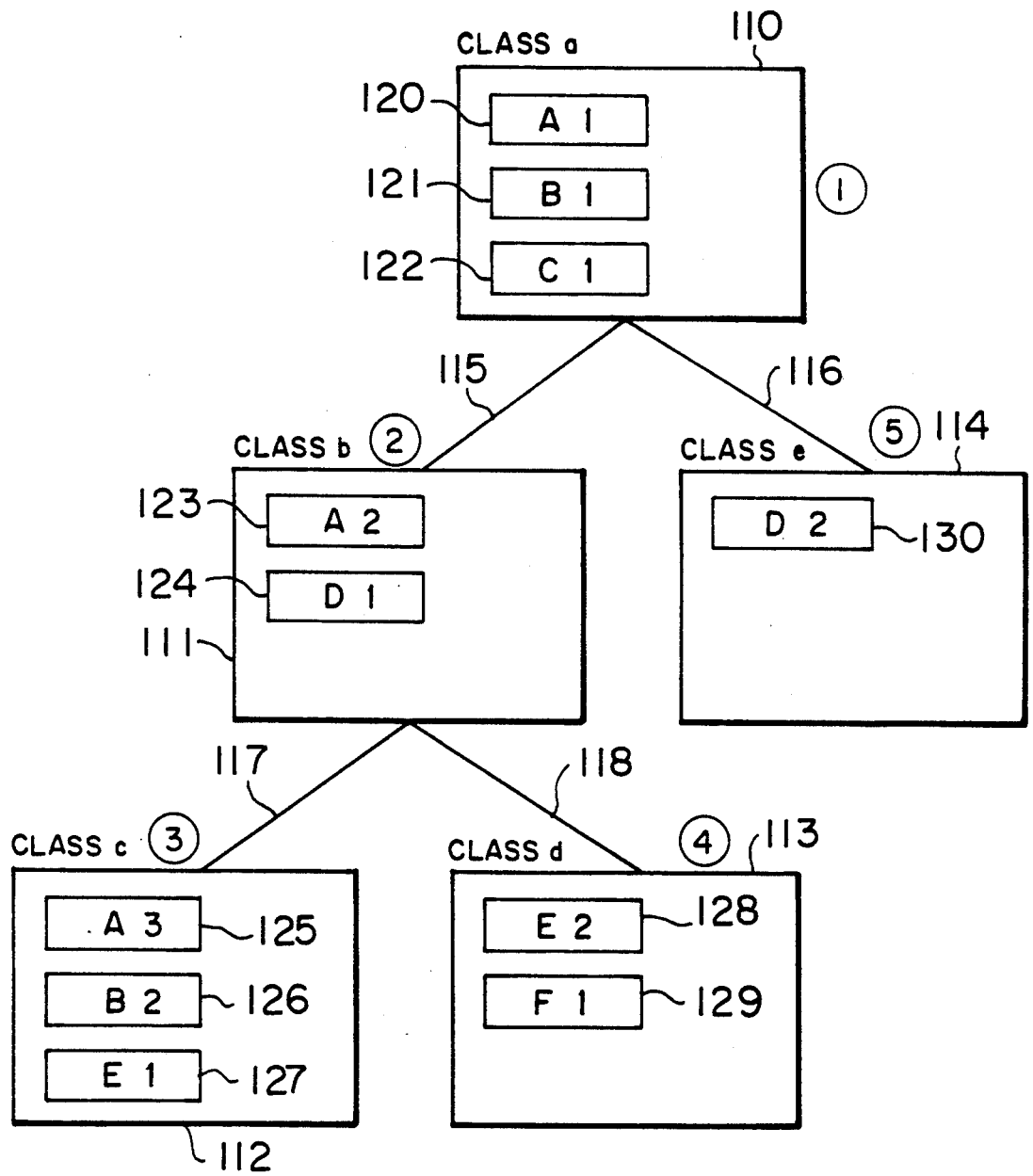
FIG. 9A is a class hierarchical diagram affixed with codes showing outputs in the step 170 shown in FIG. 8A.

Before message passing, numbers 1 to 5 which make it possible to decide the relationship of class inheritance easily for all the classes in the hierarchy illustrated in FIG. 9A are affixed in accordance with the flow shown in FIG. 8A (step 170), and, for respective message passing descriptions, candidate methods which accord with the message selector thereof and classes defining these candidate methods are extracted, thereby to draw up a correspondence table (step 171). These steps 170 and 171 are performed only once before execution of message passing.

As to the execution of message passing, a class to which the receiver belongs is obtained first as shown in FIG. 8B (step 172), a class which has a super relationship with the class of the receiver obtained in the step 172 is searched from the correspondence table of candidate methods and classes drawn up in the step 172, and the method corresponding to that class is determined as the method to be activated (step 173).

As to the coding process in abovesaid step 170, for example, the hierarchy of classes having a tree construction is traced starting from the class corresponding to the root while giving priority to the depth, and processing of numbering is performed starting from 1 in the tracing order. To be concrete, when the hierarchy of classes shown in FIG. 9A is traced starting from the class a 110 corresponding to the root in order, tracing will be made in the order of class a 110, class b 111, class c 112, class d 113 and class e 114. Thus, numbers 1, 2, 3, 4 and 5 are affixed to them in order as the codes. This coding has such a feature that a certain class and all of the sub classes thereof have codes within a specific range. For example, the class b 111 and the sub classes thereof have codes in the range of 2 to 4, and other classes than the above have codes other than the range 2 to 4, that is 1 or more than 5.

Figure 9B:
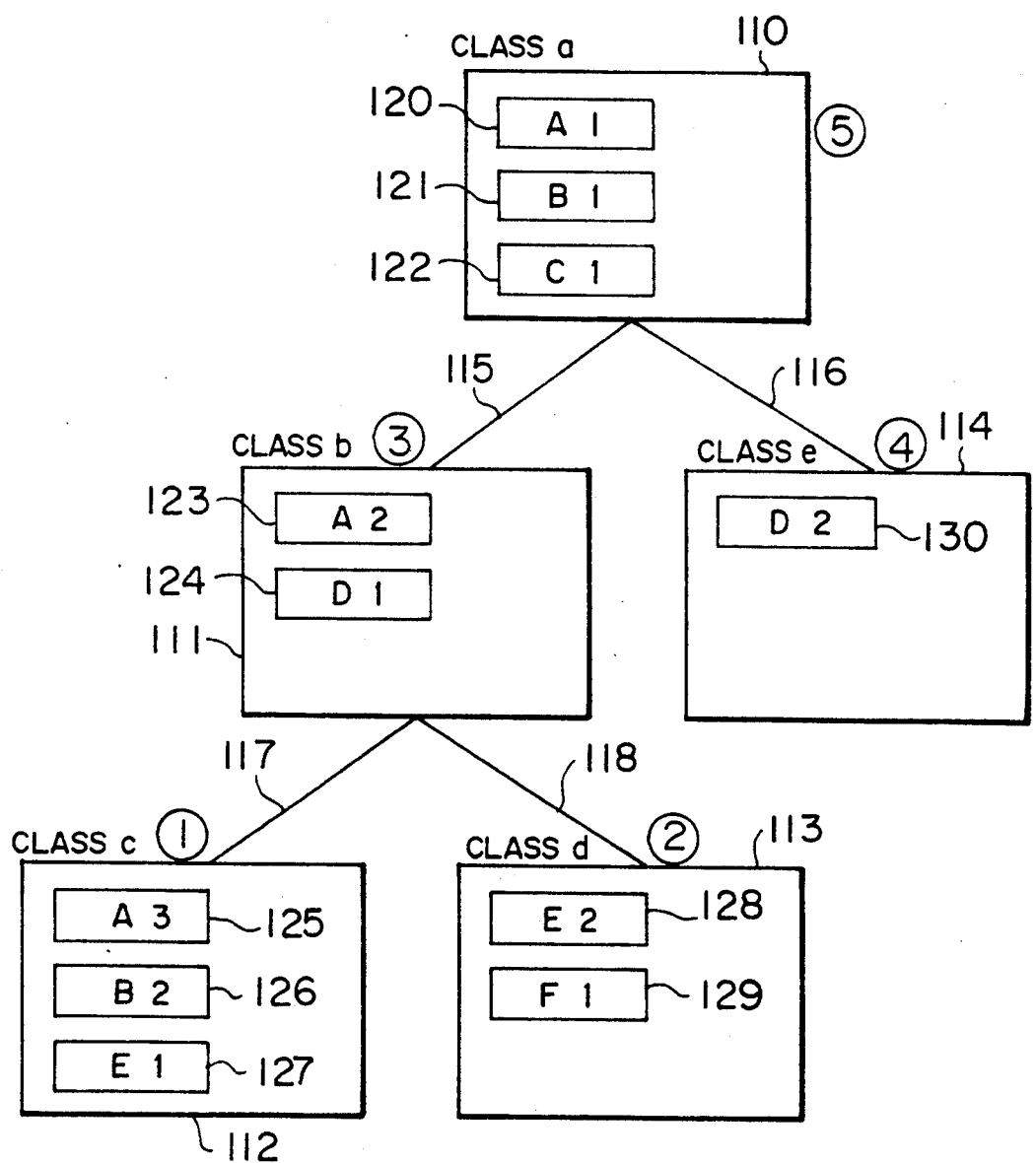
FIG. 9B is another example of a class hierarchical diagram affixed with other codes.

In the forgoing coding process, though, codes are assigned to each class at its first passing in tracing, there is another way of coding in which codes are assigned to each class at its last passing as shown in FIG. 9B. The order in which classes are traced at its last is class c 112, class d 113, class b 111, class e 114 and class a 110. Therefore, numbers 1, 2, 3, 4 and 5 are assigned to those classes. In the coding process as exemplified in FIG. 9B, it also has such a feature that a certain class and all of the sub classes thereof have codes within a specific range as in the coding process shown in FIG. 9A.

As the result of coding, the step 170 outputs a code table 180 shown in FIG. 10. The code table 180 is composed of a code column 182 of respective classes, a minimal value column 183 of codes of respective classes and the sub classes thereof and a maximal value column 184 of codes of respective classes and the sub classes thereof. Besides, the values shown in the code column 182 of respective classes and values shown in the minimal value column 183 of the sub classes thereof are always equal to each other.

In above-described step 171, candidate methods are extracted against respective message passing descriptions. In the example shown in FIG. 9A, the methods that have the message selector A against message passing:

(send ?X A(3))

are the method A1 (120), the method A2 (123) and the method A3 (125). Thus, a candidate method correspondence table 186 such as shown in FIG. 11 is drawn up. Extracted candidate methods are set in a candidate method column 185, and the classes defining these candidate methods are set in the class name column 181. The minimal value column 183 of codes of respective classes and the sub classes thereof and the maximal value column 184 of codes of respective classes and the sub classes thereof are copied from the code table 180. The entry order of the candidate method correspondence table 186 is arranged in the order from the sub class to the super class. That is, the class c 112 is entered before the class b 111.

Similarly, a candidate method correspondence table 187 shown in FIG. 12 is drawn up against message passing:

(send ?X D(3))

In the step 173 shown in FIG. 8B which is method determination processing at the execution time of message passing, the method to be activated is determined based on the correspondence table of the class of the receiver drawn up in the step 172 and the candidate methods obtain in the step 171.

Figure 13:
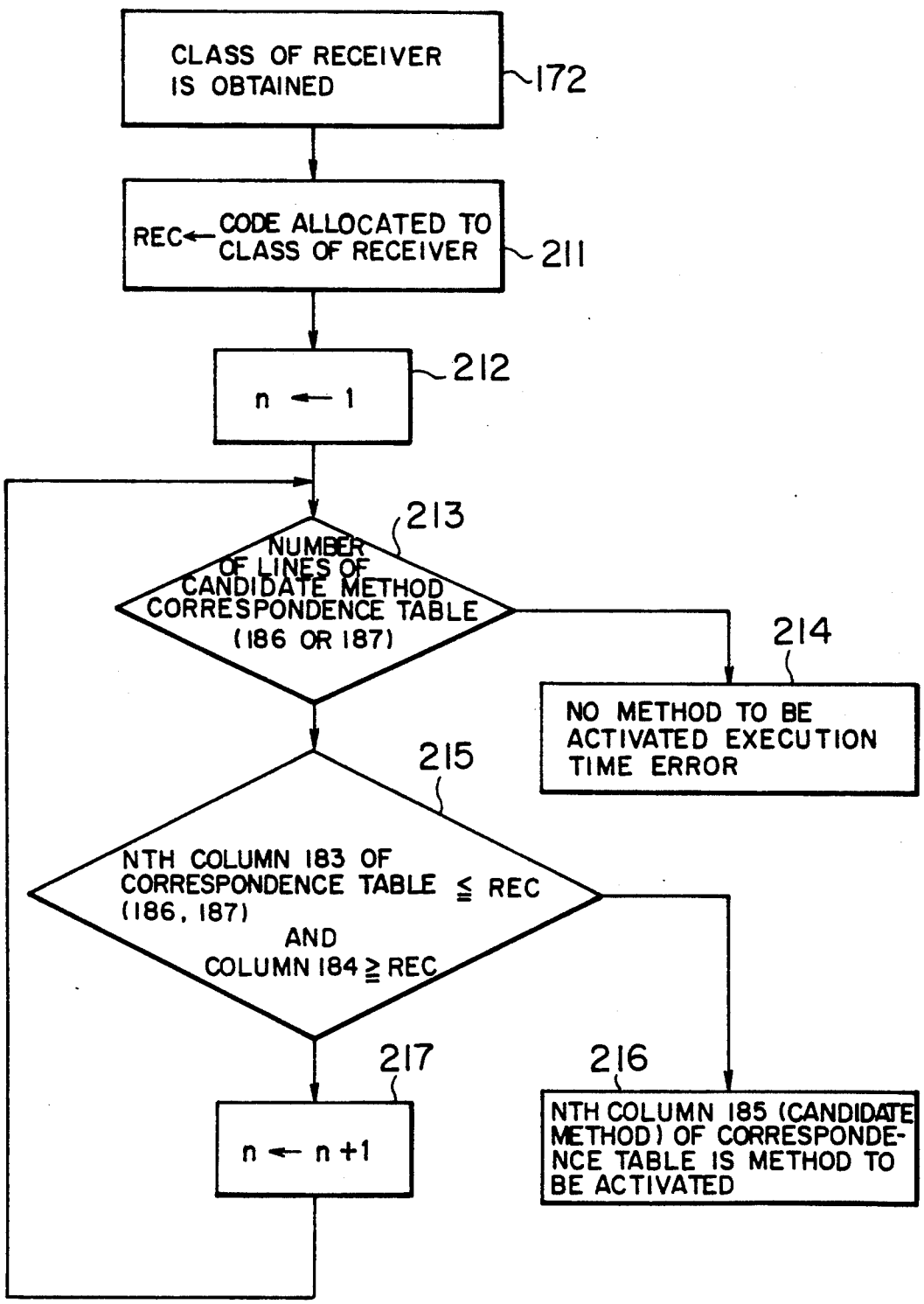
FIG. 13 is a flow chart showing in detail a process of activation method determination in the step shown in FIG. 8B.

Here, the procedure of method determination in the step 173 shown in FIG. 8B will be explained in more detail based on the flow chart shown in FIG. 13. When the class of the receiver is obtained in the step 172 shown in FIG. 8B, those codes that are allocated to the classes of the receiver are stored (step 211). Next, 1 is allocated to a variable n, and it is compared whether the number of lines in the candidate method correspondence tables 186 and 187 are larger than 1 which is this variable n or not. When the number of lines in the candidate method correspondence tables 186 and 187 are smaller than 1, it is decided that the method to be activated does not exist, and an execution time error is produced (step 214). When it is judged through the judgement in the step 213 that the number of lines is larger than n, processing is proceeded to a step 215.

In step 215, a relationship between a class written in n-th line and receiver class obtained in step 172, if the former class is judged as a super class of the latter class, then it passes onto step 216, or move to step 217 in case it does not judged, as explained in detail in the following. Accordingly, it is discriminated whether the column 183 (minimal values of codes of respective classes and the sub classes thereof) in the n-th lines (the first lines) of the correspondence tables 186 and 187 shows the code stored in abovesaid step 211 or less and the column 184 (maximal values of respective classes and the sub classes thereof) shows the code stored in abovesaid step 211 or more to discriminate relationship. When this discriminant conditions are found to be met through discrimination in the step 215, processing is proceeded to a step 216, and the column 185 (candidate methods) in the n-th lines of the correspondence tables 186 and 187 is adopted as the method to be activated.

Further, when the discriminant conditions are found not to be satisfied through the discrimination in the step 215, the value of said variable n is incremented by one in a step 217, then returning to the step 213 again. That is, the procedure in this case is proceeded in such a manner that the candidate method correspondence table is scanned in order, and when the code of the class of the receiver obtained in the step 172 shows a value within the range of the value of the minimal value column 183 of codes of respective classes and the sub classes thereof to the value of the maximal value column 184 of codes of respective classes and the sub classes thereof in the candidate method correspondence table, that candidate method is determined to be the method to be activated. For example, in case of message passing:

(send ?X A(3))

the code of the class d 113 is 4 when the class of ?X is the class d 113. Therefore, it is found by scanning the candidate method correspondence table 186 shown in FIG. 11 from the top in order that the code falls within the range of the value (2) in the minimal value column 183 of codes of respective classes and the sub classes thereof to the value (4) in the maximal value column 184 of codes of respective classes and the sub classes thereof of the method A2. Thus, it is possible to determine that the method to be activated is the method A2. Further, when the class of ?X is the class a 110 in message passing:

(send ?X D(3))

since the code of the class a 110 is 1, any method including 1 as the range cannot be found even if the candidate method correspondence table 187 shown in FIG. 8 is scanned. Thus, it is realized that the method to be activated does not exist, but the execution time error is produced.

As described above, the search time of the message passing of the method determining process of the present embodiment depends on the size of the candidate method correspondence table. The size of the candidate method correspondence table is equal to the number of methods having the same name which are defined in the whole class hierarchy, and has no relation to the number of methods defined in the class as in the conventional processes I and II.

When the effect of above-described embodiment I is compared with that of the conventional process II, it is found that the method determining speed in the conventional process II depends on the number of methods which are defined and inherited in the class to which the receiver in message passing belongs, whereas the method determining speed in abovesaid embodiment depends on the number of methods which accord with the message selector in message passing.

In a large-scale system, the number of methods inherited by respective classes is 100 or more in many cases, and comparison in seven times or more is required in an average for the conventional process II when the dichotonizing search is employed. On the contrary, the number of methods having the same message selector is few in general, which is one or two in most cases. In above-described embodiment, however, it is possible to determine the method by comparison in one or two times, thus making it feasible to implement high-speed message passing.

In the next place, a second embodiment of the present invention will be explained with reference to FIG. 14.

In the present embodiment (embodiment II), the coding processing (step 170) of the coding portion 200 (FIG. 8A) shown in FIG. 7 according to the embodiment I described previously is modified.

The coding processing in the present embodiment has such features as follows. When there are two classes C1 and C2, codes of C1 and C2 are assumed to be F1 and F2, respectively, and the code lengths of F1 and F2 are assumed to be L1 and L2, respectively. Here, composition is formed in such a manner that, if C1 is the super class of C2, the upper L1 bits of F2 which is the code of C2 is in accord with F1 which is the code of C1. In contrast with this, if the upper L1 bits of F2 which is the code of C2 is in accord with F1 which is the code of C1, it is guaranteed that C1 is the super class of C2.

Figure 17:
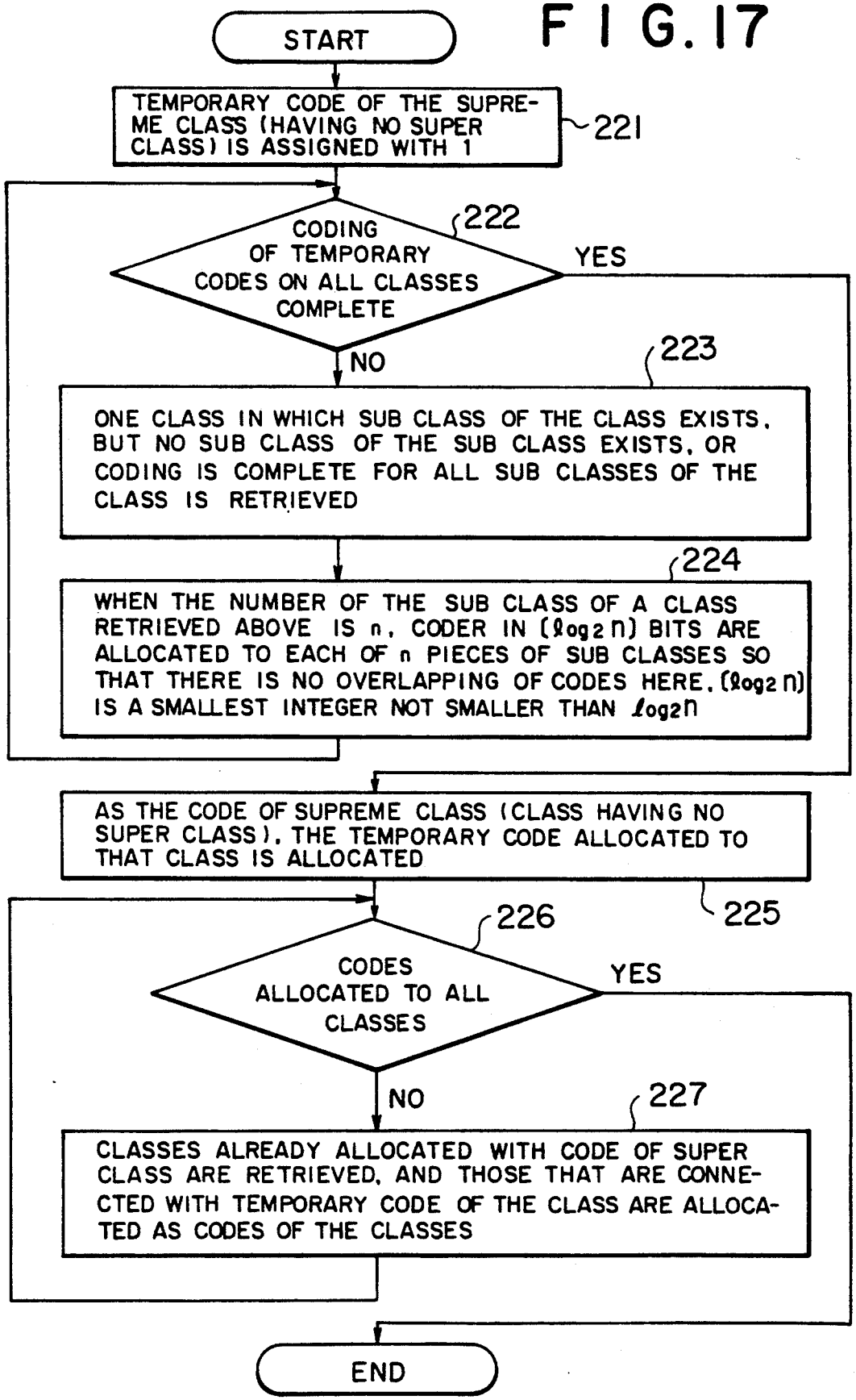
FIG. 17 is a flow chart for explaining in detail the coding processing in the step 170 in this second embodiment.

Here, the procedure of allocating codes to the hierarchical structure shown in FIG. 9 will be explained based on a flow chart shown in FIG. 17.

First, a temporary code of the class a is set at 1 (step 221), and since temporary coding is not terminated (step 222), processing proceeds to a step 223. In the processing of this step 223, the class b is retrieved as a class in which no sub class of a sub class exists.

In a next step 224, since the number of sub classes of this sub class b is two, temporary codes of $[\log_2 2] = 1$ bit are allocated to respective sub classes (classes c and d) of the class b. To be concrete, "0" is allocated to the class c and "1" is allocated to the class d, then returning to the step 222.

Then, processing proceeds to the step 223 again, and the class a is retrieved as the class in which sub classes of all the sub classes are coded temporarily. Here, in the step 224, a temporary code of 1 bit is allocated to the sub classes (class a and class c) of the class a. To be concrete, "0" is allocated to the class b and "1" is allocated to the class e.

Here, since it is found through discrimination in the step 222 that temporary codes have been allocated to all the classes, processing proceeds to a step 225. Temporary code allocation to respective classes at this time appears as follows.

| class a | 1 |
|---|---|
| b | 0 |
| c | 0 |
| d | 1 |
| e | 1 |

In the step 225, the code of the class a becomes "1" which is equal to the temporary code thereof. Thereupon, processing proceeds from the discriminant block in a step 226 to a step 227, and those classes in which codes have been allocated to the super classes become the class b and class e. Accordingly, "10" and "11" in which temporary codes ("0" and "1") of the class b and the class e are affixed after the code of the super class (class a) are taken as respective codes. Similarly, "100" and "101" in which temporary codes "0" and "1" are affixed after the code "10" of the super class (class b) are allocated to classes c and d, too. By means of processing based on said flow chart shown in FIG. 17, it is possible to obtain the result shown in FIG. 14.

FIG. 14 shows the result of coding the class hierarchy shown in FIG. 9 according to the present embodiment. For example, since the class b 111 is a super class of the class d 113, the super two bits (code length of class b 111) of the code of the class d 113 accords with the code of the class b 111.

In such a manner, correspondence tables of FIG. 15 and FIG. 16 are drawn up against the correspondence tables of FIG. 11 and FIG. 12 shown in the first embodiment. In the second embodiment, the discriminant block in the step 215 performs discrimination in the flow chart shown in FIG. 13 of the first embodiment depending on whether the super 1 bit of the receiver and class stored in advance accords with C when the code of the column at the right end of the n-th line of the correspondence table is assigned with C and the code of C is assigned with 1. When 1 and C are in accord with each other, the column in the n-th line of the correspondence table becomes the method to be activated, and in case of disaccord, the value of n is incremented by 1 and the loop is repeated again. Therefore, the decision processing of the relationship of class inheritance is different to some extent, but the total processing time is substantially the same.

Figure 18:
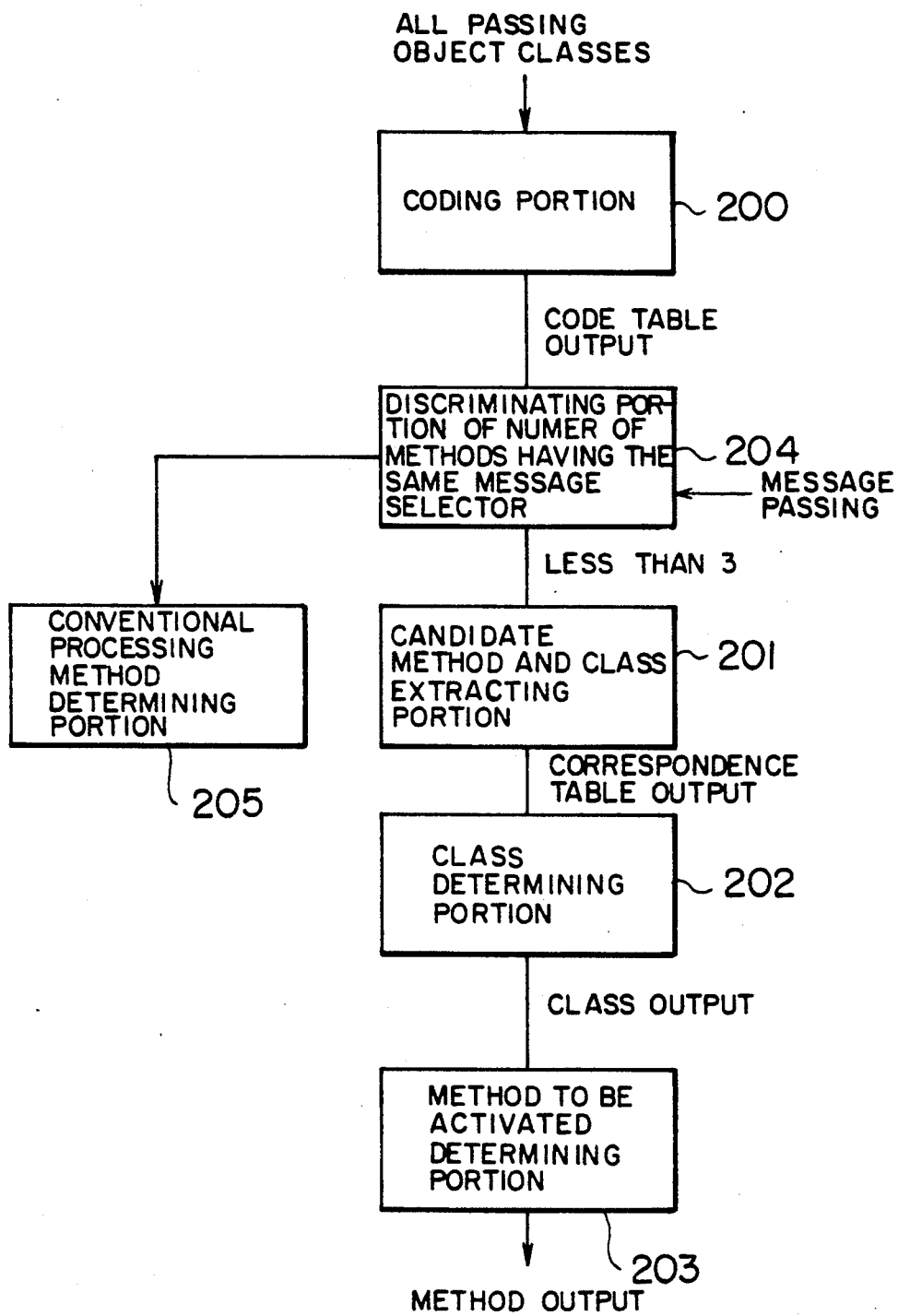
FIG. 18 is a block diagram showing the composition of a third embodiment.

FIG. 18 shows a third embodiment of the present invention. In the composition of this third embodiment, there is provided a method number discriminating portion 204 having the same message selector between the coding portion 200 and the candidate method class extracting portion 201 in addition to the composition of the first embodiment shown in FIG. 7. The feature of the composition of the third embodiment exists in that processing is performed in accordance with the number of methods having the same message selector as the selector included in message passing, and the conventional technique is followed if the method number is at a predetermined number or more and the technique of the present invention is followed if the method number is at a certain number or less by the fact that there is provided the method number discriminating portion 204 of the same message selector. For this purpose, the method number discriminating portion 204 of the same message selector is connected either to the conventional method determining portion 205 or to the block following the candidate method class extracting portion 201 described in the first embodiment.

That is, in the processes in above-described respective embodiments, in case of message passing including the message selector in which the methods having the same message selector is few in number, it is possible to determine the method to be activated at a high speed in determining the method. However, when there are a plurality of methods having the same message selector, it is required to search the candidate method correspondence tables one after another, which requires a long time for processing.

The present embodiment (the third embodiment) is to cope with abovesaid situation. In case of message passing including the message selector in which the methods having the same message selector are few in number, that is, when the number of candidate methods is few in number, processes shown in above-described respective embodiments are used, and when there are a plurality of candidate methods, a method determining process according to abovesaid conventional process is used.

As a reference of decision of the quantity of candidate methods, decision should be made by measuring the overhead of a practical system, however, it is assumed tentatively here that two or less is a small number and three or more is a large number. This reference can be altered easily.

Figure 19A:
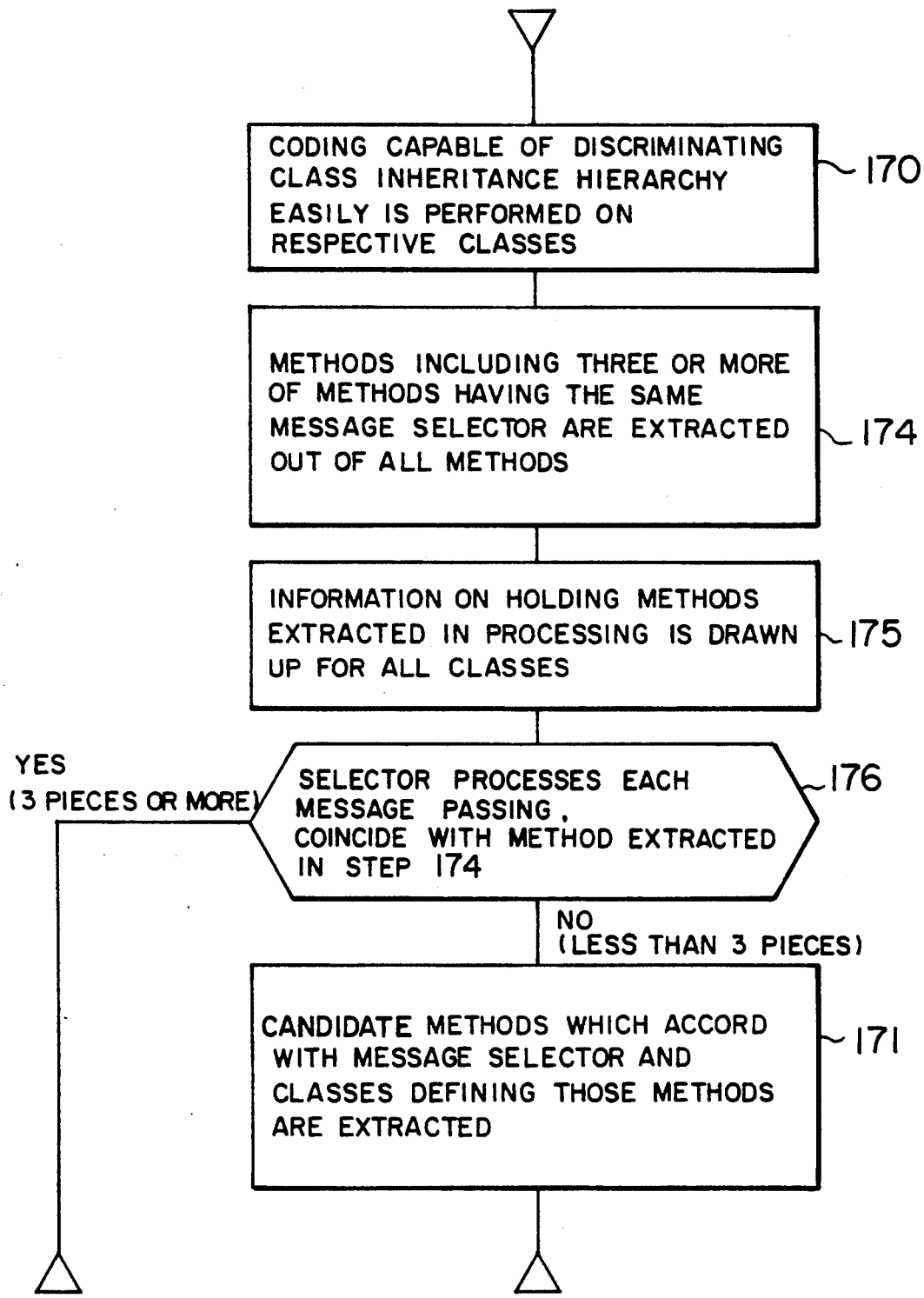
FIGS. 19A, 19B and 19C are flow charts showing the operation of the composition shown in FIG. 18.
Figure 19B:
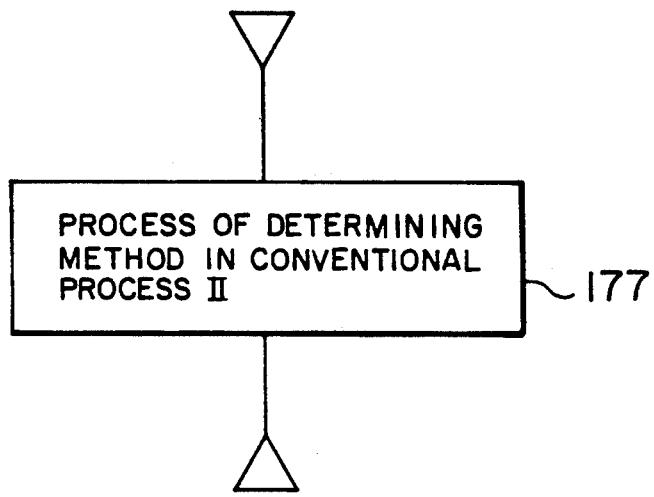
Figure 19C:
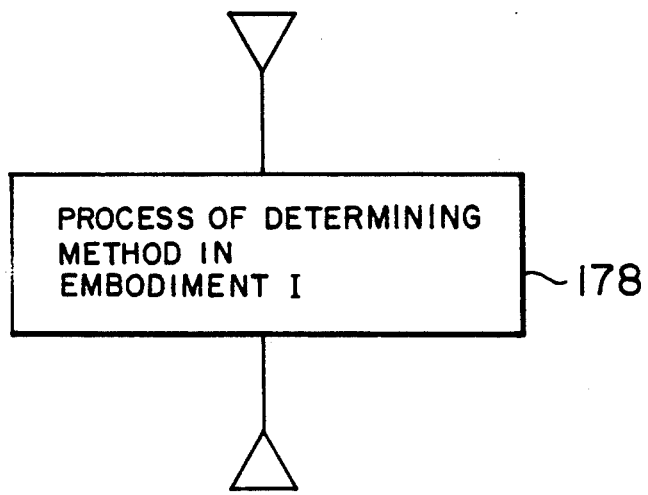

FIG. 19A and FIG. 19B are flow charts showing the outline of processing according to the present embodiment. The steps 170 and 171 are similar to those that are shown in above-described respective embodiments. In the present embodiment, coding which is capable of discriminating inheritance hierarchy of classes is performed first on respective classes before execution of message passing (step 170). The coding process may be any of those that have been shown in above-described respective embodiments, but the coding process shown in the embodiment I will be adopted here.

Next, those methods in which there are three or more of methods having the same message selector are extracted (step 174). The methods extracted in the step 174 are out of the object of the method determining process shown in above-described embodiment I, and a conventional method determining process is applied to those methods. For this purpose, information showing a holding state of the methods extracted in the step 174, that is, a search table for searching the methods in the classes is drawn up for all the classes (step 175).

Next, in order to distinguish whether the method determining process of the conventional method II is used or the method determining process of the embodiment I is used, it is decided whether the message selector in every message passing accords with the methods extracted in the step 174 or not (step 176). In order to apply the method determining process of above-described embodiment I to message passing which did not accord with said extracted methods, a candidate method correspondence table is drawn up (step 171). Based on the above, the method is determined by using the method determining process of the conventional process II for message passing which is decided to be in accord in the step 176, and the method is determined by using the method determining process of above-described embodiment I for message passing which is decided to be in disaccord at the execution time of message passing.

When the method determining process of the present embodiment is applied to the class hierarchy and the method definition state shown in FIG. 9, the methods having the message selector A (method A1 (120), method A2 (123) and method A3 (125) are extracted in the step 174, and the method holding information shown in FIG. 20 is drawn up in the step 175. As it will be realized by comparing with the method holding information of the conventional process shown in FIG. 4 previously, the method holding information in the present embodiment is composed only of those that are extracted in the step 174, thus providing compact information.

Since the message selector A is in accord with the methods extracted in the step 174 for message passing:

(send ?X A(3))

in the present embodiment, the method holding information shown in FIG. 11 is checked in accordance with the class to which ?X which is the receiver at the execution time of message passing belongs and the method to be activated is determined in accordance with the conventional process II. Further, since the message selector D does not accord with the methods extracted in the step 174 for message passing:

(send ?X D(3))

the candidate method correspondence table 187 shown in FIG. 12 is drawn up as the step 171 in the similar manner as the embodiment I, and the method to be activated is determined from the class to which ?X which is the receiver at the execution time of message passing belongs and the candidate method correspondence table 187. Detailed determining process is quite the same as that of the embodiment I.

The effects of the present embodiment are as follows. That is, above-described method determining process of the embodiment I is used for message passing which does not accord with the methods extracted in the step 174. Therefore, similarly to the embodiment I, the method is determined by comparison in two times or less as against the conventional method II which requires comparison in seven times or more in an average. Besides, the method which requires comparison in three times or more is extracted in abovesaid step 174, and the method determining process of the conventional process II is applied. Further, the conventional process II is applied for message passing which accords with the methods extracted in the step 174, but the method which becomes the searching object is only the method extracted in the step 174 among those methods that are defined and inherited in the class of the receiver in the present embodiment III as against the conventional process II in which the searching object is all the methods defined and inherited in the class of the receiver. Accordingly, it is possible to determine the method at a higher speed than the conventional process.

Thereupon, when it is assumed that the methods extracted in the step 174 are $\frac{1}{4}$ of the whole methods, the number of comparison times is reduced by two times in the case of the dichotomizing search. Thus, method determination at a higher speed than the conventional process is possible in any message passing.

Figure 21:
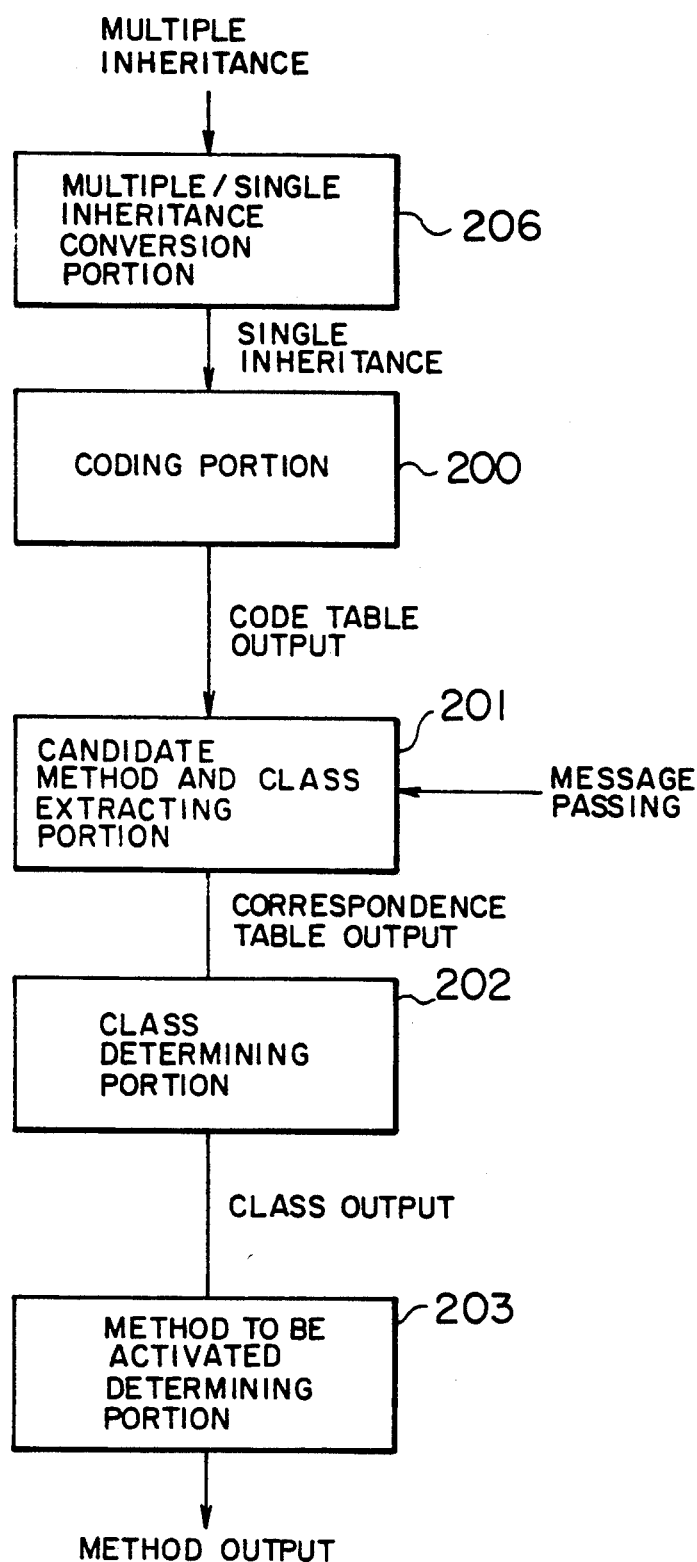
FIG. 21 is a block diagram of a fourth embodiment.

As a fourth embodiment, FIG. 21 shows a device having such a composition that there is provided a multiple/single conversion portion 206 on the input stage side of the coding portion 200 so that processing may be performed by the techniques which have been heretofore explained in the first through the third embodiments after converting the hierarchical relationship of multiple inheritance into the relationship of single inheritance in advance.

In above-described embodiments I through III, the object oriented language as the object is a language of single inheritance as the hierarchical relationship of classes, but multiple inheritance is taken as the object here. That is, respective classes can have a plurality of classes as the direct super classes thereof, and inherit the methods from these super classes, respectively. A priority is defined to a plurality of direct super classes, and the methods inherited from the classes of low priority are neglected when different methods having the same message selector are inherited from those direct super classes, respectively.

Figure 22:
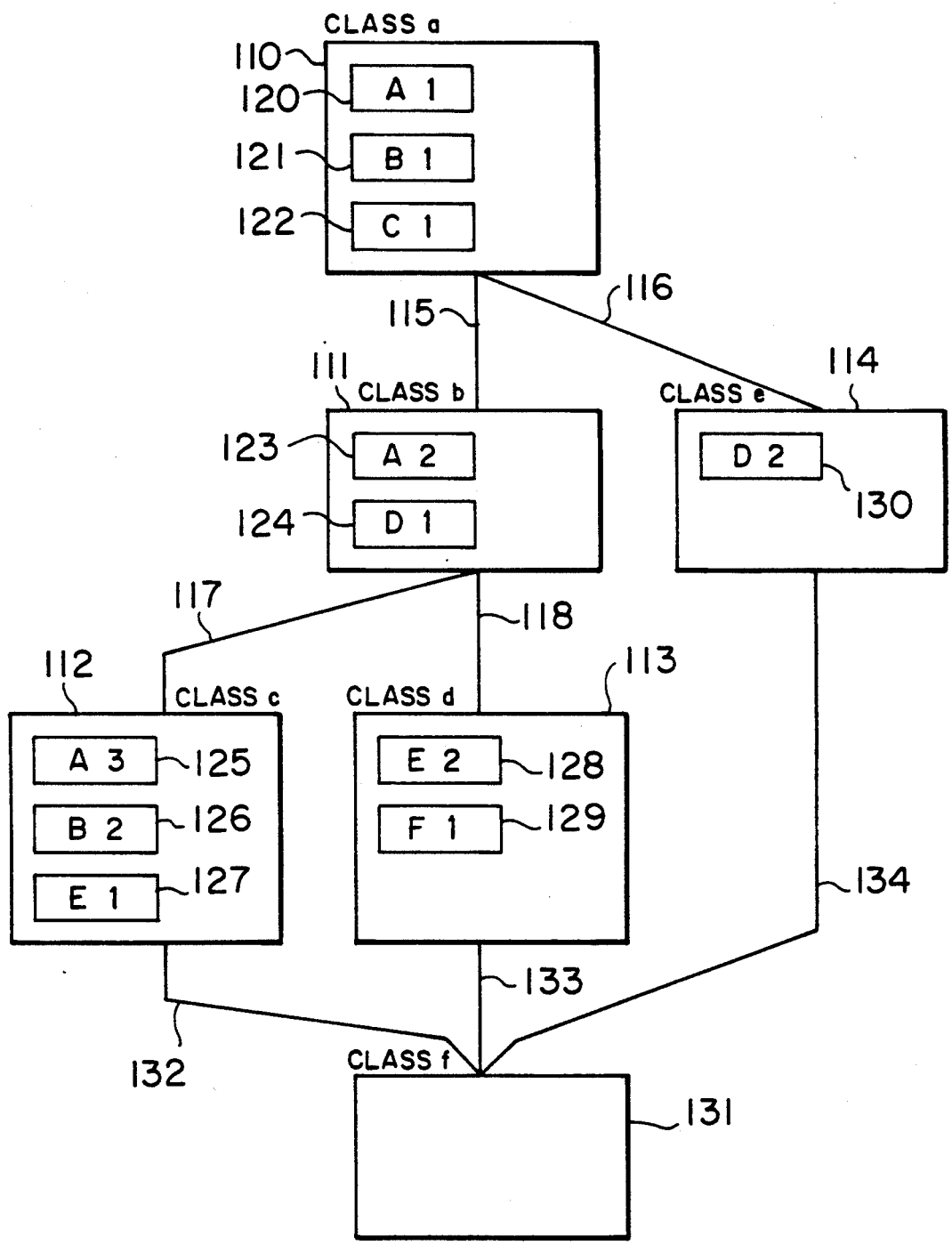
FIG. 22 is a hierarchical block diagram including a hierarchy of multiple inheritance which is an object in the fourth embodiment.

FIG. 22 shows an example of the class hierarchy and the method definition state of the present object oriented language In this example, a class f 131 has the class c 112, the class d 113 and the class e 114 as the direct super classes. The priority of inheritance is to be in the order of the relationship of inheritance 132 with the class c 112, the relationship of inheritance 133 with the class d 113 and the relationship of inheritance 134 with the class e 114.

The methods inherited by the class f 131 are all the methods held by the class c 112 from the class c 112, the method F1 (129) from the class d 113, and no inheritance from the class e 114. Here, the method E2 (128) from the class d 113 does not inherit because it inherits the method E1 (127) having the same name from the class c 112, and the method D2 (130) from the class e 114 does not inherit because it inherits the method D1 (124) having the same name from the class c 112.

Figure 23:
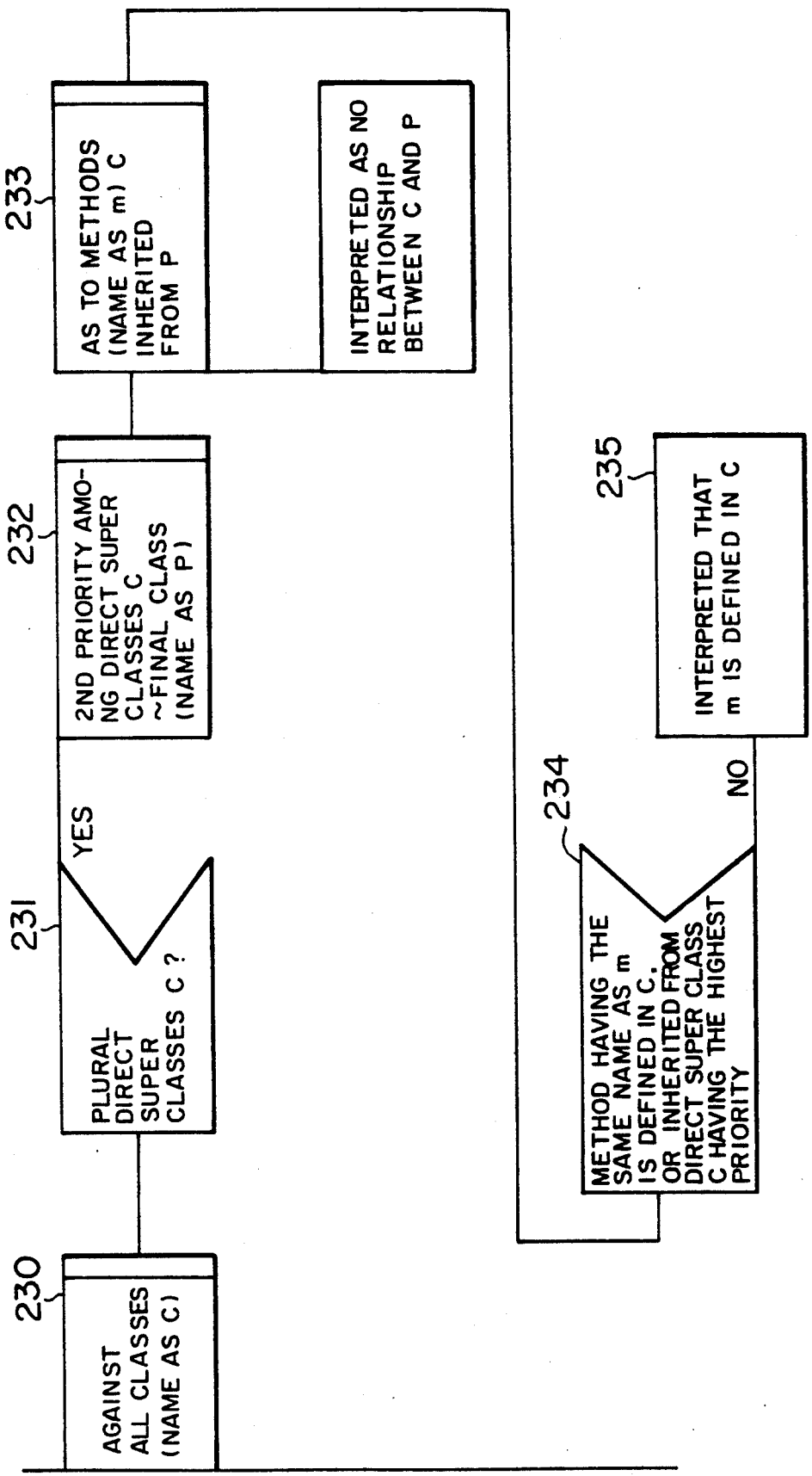
FIG. 23 is a PAD diagram for explaining the operation of multiple/single inheritance conversion portion in FIG. 21 which is the featured portion of the third embodiment.
Figure 24:
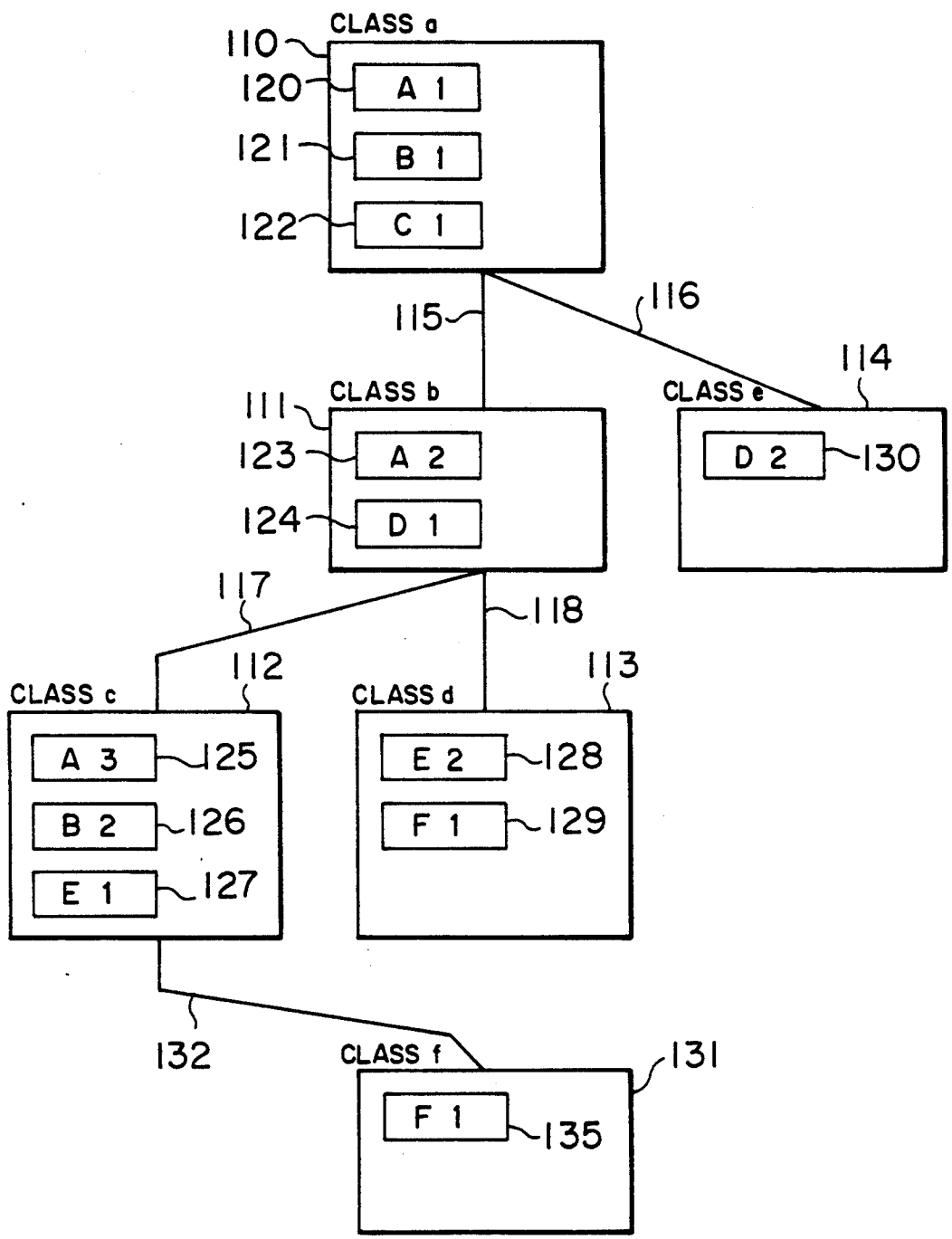
FIG. 24 is a block diagram of a hierarchy created by multiple/single inheritance conversion processing in FIG. 23.

In the class hierarchy of multiple inheritance, a process of deciding the relationship of class inheritance used in above-described embodiments I through III cannot be used, and the method determining process in the embodiments I through III cannot be used as it is. However, if it is interpreted that the method inherited from the direct super class other than the direct super class having the highest priority is the method defined in its own class, it is possible to create an equivalent method definition state in the class hierarchy of single inheritance. That is, the class hierarchical diagram shown in FIG. 24 is equivalent to the class hierarchical diagram shown in FIG. 22 under the method definition state. A multiple/single inheritance conversion from multiple inheritance shown in FIG. 22 into single inheritance shown in FIG. 24 is realized according to PAD diagram as shown in FIG. 23. At the beginning, in step 230, each class is named as "c", and the each "c" is processed according to following steps 231 to 236. In step 231, if there are plurality of direct super classes c (multiple inherited from plurality of classes), then c is processed in steps 232 to 236, if not, return to step 230 for processing of next c. In step 232, a named class as "p" from 2nd priority among direct super class c to final class is processed according to steps 233 to 236. In step 233, all the methods which c inherited from p are processed according to steps 234 to 235, then move to step 236. In step 234, if method having the same name as m is defined in c, nor inherited from direct super class c having the highest priority, then move onto step 235 interpreting m is defined in c, and returns to step 235 for execution of the following method. In step 236, returns to step 232 interpreting no relation between c and p.

In FIG. 24, a method F1 (135) which is exactly the same as the method F1 (129) defined in the class d 113 is defined in the class f 131. Therefore, the methods held by the class f 131 are the methods inherited from the class c 112 and the method F1 (135). In the present embodiment, the method determining process shown in above-described respective embodiments are applied after converting the class hierarchy including multiple inheritance which is the object into an equivalent class hierarchy of single inheritance.

According to the first through the fourth embodiments heretofore shown, there is such an effect that a process in which the relationship of class inheritance is decided at a higher speed can be implemented by performing coding processing of affixing codes to respective classes in advance so as to perform decision processing of the relationship of inheritance from the codes affixed to two classes in which it is desired to decide the relationship of inheritance in a decision process of the relationship of class inheritance of an object oriented language having a hierarchical relationship of classes. Further, in a method determining process of determining a method to be activated by message passing described in the object oriented language based on the information of a receiver which is a passing destination of message passing and the message selector of message passing, candidate extraction processing of the method to be activated is performed based on the message selector and method final decision processing for determining the method to be activated finally based on said information of the receiver among extracted candidate methods. Thus, there is such an effect that a method determining process at a higher speed than a conventional process may be implemented.

What is claimed is:

1. A computer implemented process of operating an object oriented language having a plurality of classes in a class hierarchical relationship in a single inheritance and using a message passing to activate a method, comprising:
affixing codes to each of said plurality of classes wherein the codes have a predetermined relation to each other as a basis for the class hierarchical relationship; and
deciding at a time of said message passing, the class hierarchical relationship between the plurality of classes by identifying the predetermined relation between said codes affixed to said classes having said class hierarchical relationship, wherein said affixing occurs prior to said deciding.

2. The process of operating an object oriented language according to claim 1, wherein the affixing comprises using numerical characters as said affixed codes, and wherein the numerical characters, with a specific class as a reference and comprising the codes of classes in a sub hierarchy thereof, are numerical values that increase consecutively from a first numerical character affixed to said specific class to a predetermined range.

3. The process of deciding class hierarchical relationship of an object oriented language according to claim 2, wherein, in said decision of relationship of inheritance, when the code of a certain specific class is a numerical character within said predetermined range of the class in a sub hierarchy of a class different from said specific class, said specific class is decided to be a class in the sub hierarchy of said different class.

4. The process of operating an object oriented language according to claim 1, wherein said affixing comprises traversing all classes in the class hierarchy having a tree structure from a root class of the tree structure by a depth-first and left-to-right strategy and affixing the code of each class when the class is first traversed.

5. The process of operating an object oriented language according to claim 1, wherein said affixing comprises a first traversing of all classes in the class hierarchy having a tree structure from a root class of the tree structure and a second traversing by upward strategy, and the code of each class is affixed during the second traversing.

6. The process of operating an object oriented language according to claim 1, wherein the affixing codes comprises a processing in which codes of varied length are used as the codes and affixing a certain code including a code pattern of a certain class for the codes of all the classes in a sub hierarchy of said certain class.

7. The process of operating an object oriented language according to claim 6, wherein said deciding of the relationship of inheritance comprises deciding, when the certain code of the certain class includes a code of a different class, that said certain class is a class in a sub hierarchy of said different class.

8. A computer implemented process of operating an object oriented language comprising classes which determines a method to be activated by message passing described in an object oriented language from information of a receiver which is a passing destination in the message passing and a message selector includes in the message passing, comprising:
affixing codes each having a predetermined relation to each of said classes of the passing destination of the message passing;
performing extraction processing of candidate methods to be activated based on information of said message selector and on said codes affixed, and prior to the message passing deciding a relationship of inheritance in a hierarchy of two optional classes from said codes affixed to said two optional classes; and
determining the method to be activated based on said relationship of inheritance of said receiver among candidate methods extracted by said extraction processing, wherein said determining is performed when the message passing is performed.

9. The process of operating an object oriented language according to claim 8, wherein said extraction processing of the candidate methods includes extracting all the candidate methods having a same message selector as the message selector passed in message passing irrespective of said information of said receiver.

10. The process of operating an object oriented language according to claim 9, wherein, after said extraction processing of the candidate methods having the same message selector, includes performing said method determining only when a number of extracted candidate methods is less than a predetermined number.

11. The process of operating an object oriented language according to claim 10, wherein said extraction processing of candidate method includes performing said extraction processing prior to each execution of said message passing.

12. The process of operating an object oriented language according to claim 9, wherein, in a method final determination processing, said determining includes comparing each class holding the candidate methods extracted by said candidate extraction processing with the class to which said receiver belongs, and selecting one class by a result of said comparing, and activating the candidate method held by said selected one class.

13. The process of operating an object oriented language according to claim 12, wherein said comparing includes deciding a class hierarchical relationship between each class holding the candidate methods extracted by said extraction processing and the class to which said receiver belongs, and said selecting includes selecting a second class which is a super class of the one class to which said receiver belongs.

14. A computer-implemented process of operating an object oriented language in which a method to be activated by message passing described in the object oriented language is determined from information of a receiver which is a passing destination of said message passing and a message selector includes in said message passing, comprising extracting those methods that are possible to activated by said message passing before execution of said message passing, and determining the method to be activated among those methods that are extracted by said extraction processing at execution time of said message passing.

15. The process of operating an object oriented language according to claim 14, further including, when the method to be activated by said message passing can be decided unequivocally before execution of said message passing, determining the method to be activated before execution of relevant message passing.

16. The process of operating an object oriented language according to claim 9, wherein:
providing said object oriented language with a class hierarchy including multiple inheritance;
converting said class hierarchy including multiple inheritance into a class hierarchy of single inheritance having an equivalent relationship with respect to methods inherited; and
extracting the methods to be activated with respect to said converted class hierarchy of single inheritance.

17. The process of operating an object oriented language according to claim 16, wherein said converting into a single inheritance is made, for those classes that inherit the methods from a plurality of super classes, into a class hierarchy of single inheritance only from the super class having the highest priority in the relationship of inheritance of said plurality of super classes which is designated in advance.

* * * * *

UNITED STATES PATENT AND TRADEMARK OFFICE
CERTIFICATE OF CORRECTION

PATENT NO. : 5,313,633
DATED : May 17, 1994
INVENTOR(S) : Hiroshi Tomita, et al.

It is certified that error appears in the above-indentified patent and that said Letters Patent is hereby corrected as shown below:

Claim 8, column 16, line 53, delete "includes" and substitute therefor --included--.

Claim 14, column 18, line 4, delete "includes" and substitute therefor --included--; and,
   line 6, after "to" insert --be--.

Signed and Sealed this

Twenty-third Day of August, 1994

Attest:

BRUCE LEHMAN

Attesting Officer

Commissioner of Patents and Trademarks